Figure 1:
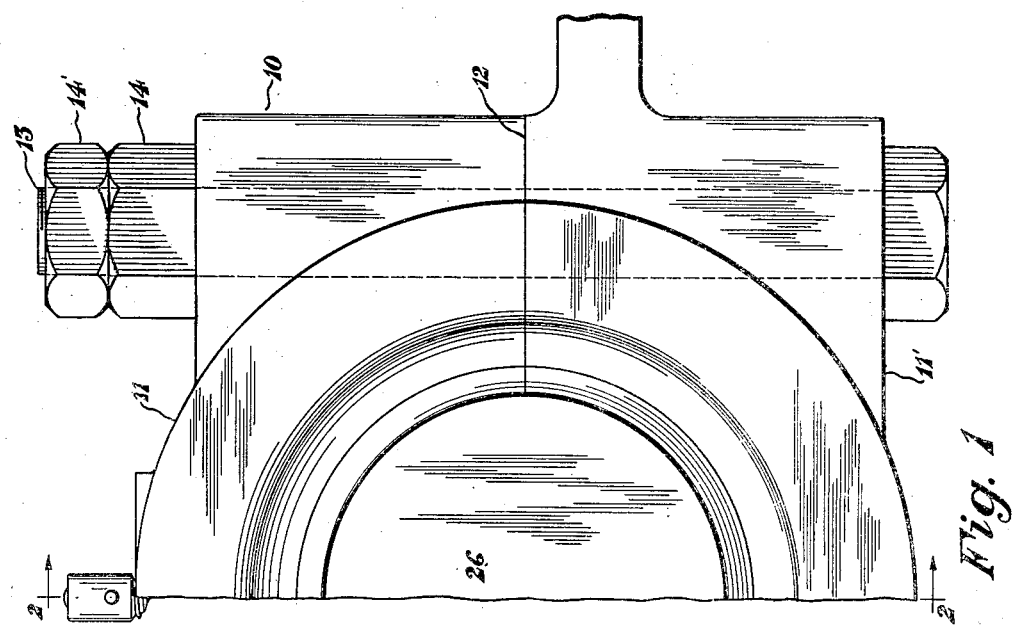

Oct. 14, 1930.  E. H. KENDALL  1,778,391
BEARING MOUNTING
Filed Dec. 8, 1927  2 Sheets-Sheet 1

Inventor
E. H. Kendall
By Fraser & Bond, Attorneys

Oct. 14, 1930.   E. H. KENDALL   1,778,391
BEARING MOUNTING
Filed Dec. 8, 1927   2 Sheets-Sheet 2

Inventor
E. H. Kendall
By Freese and Boud
Attorneys

Patented Oct. 14, 1930

1,778,391

UNITED STATES PATENT OFFICE

EDGAR HOMER KENDALL, OF ALLIANCE, OHIO

BEARING MOUNTING

Application filed December 8, 1927. Serial No. 238,526.

My invention relates to mountings for use either with sleeve or anti-friction bearings, and more particularly of the larger sizes as used in heavy machinery such as travelling cranes and the like.

In such machinery it is desirable to accurately aline the bearings for the opposite ends of the shafts thereof, but it is exceedingly difficult and almost prohibitively expensive to so aline the bearings without providing self-alining, or compensating mountings therefor.

Self-alining mountings have been made which include separable caps provided with internal spherical surfaces for being secured and fitted about the external spherical surface of a tubular or cup housing in which the outer raceway ring of a roller bearing may be seated and through or into which extends the shaft for which the roller bearing is provided, a gland ring being usually connected to the housing by screws, and either or both the gland ring and the housing having means providing an oil seal about the shaft turning therein.

Such an arrangement including, as it does, the outer raceway ring for the roller bearing, the tubular housing, and the gland ring connected by screws to the housing, is relatively expensive to manufacture, due to the weight of material required, and the number of machining operations; and when, as is frequently the case, the bearing is subject to thrust loads, the gland ring and the housing are frequently separated from each other by failure of the connecting screws.

Accordingly, the objects of the present improvements are to provide a self-alining mounting more particularly for roller bearings of any desired type, or if desired for sleeve bearings of bronze, babbitt, or the like, and which shall require a minimum weight of material, and which shall be economical to manufacture by reason of the simplified construction and arrangement of its parts, and which shall be adapted to resist any desired thrust load.

These objects are attained in the improved bearing mounting of the present invention by a construction and arrangement hereinafter set forth in detail, and which may be stated in general terms as including separable caps provided with internal spherical surfaces for fitting directly about and securing the spherical outer surfaces of a roller bearing outer raceway ring or a sleeve mounting ring, the shaft, for which the bearing and mounting is provided, extending and fitting into the inner roller bearing raceway ring or the sleeve, and end seals and thrust members whose inner end faces abut against the outer end faces of the outer raceway or sleeve mounting ring, and whose peripheral faces continue the spherical conformation of the outer raceway or the sleeve mounting ring and are secured in and by the caps having the spherical internal surfaces for fitting thereabout as aforesaid.

Figure 2:
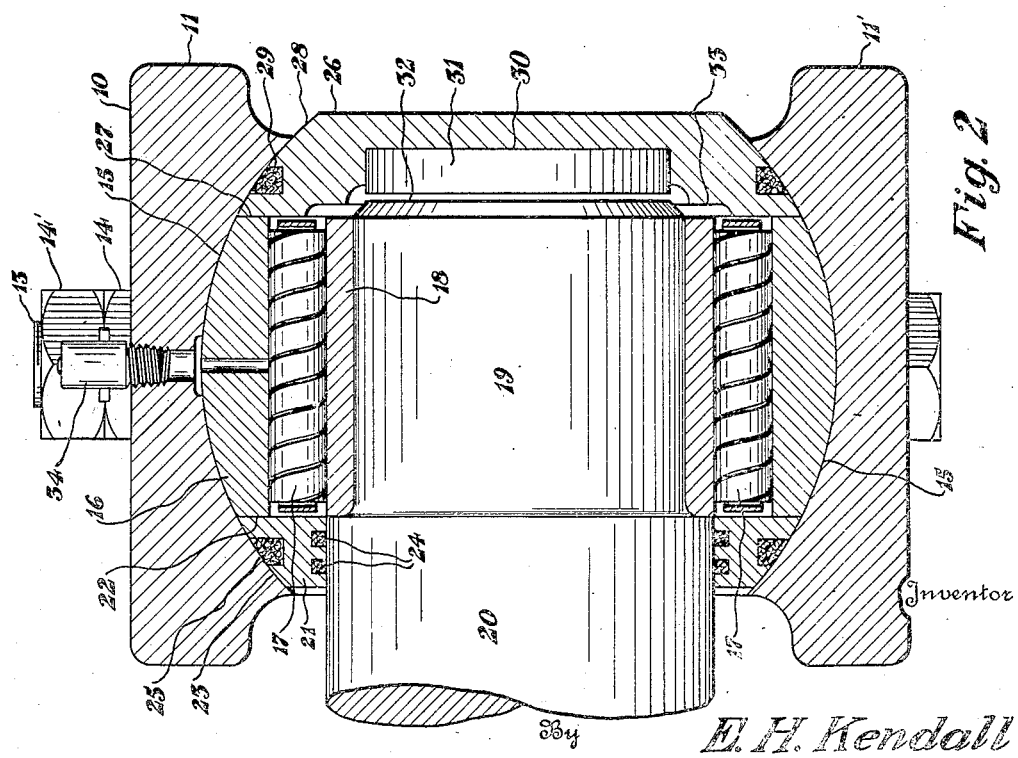
Figure 5:
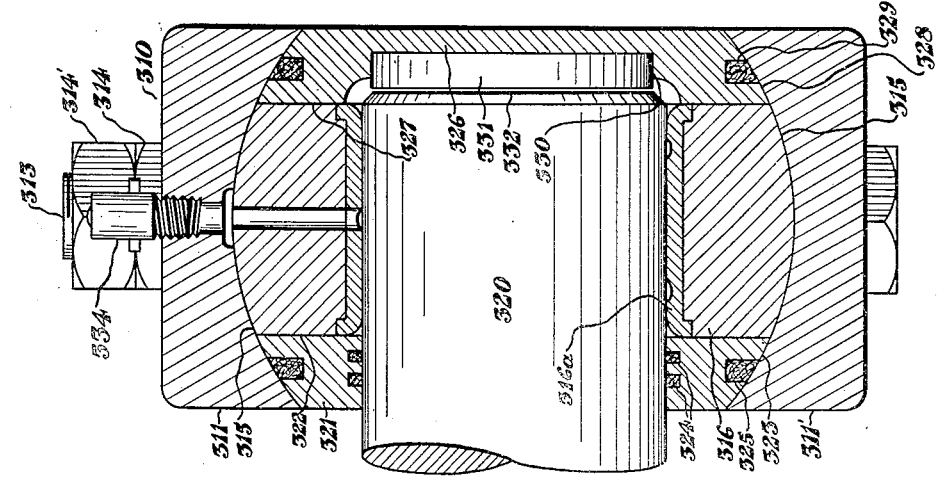
Figure 4:
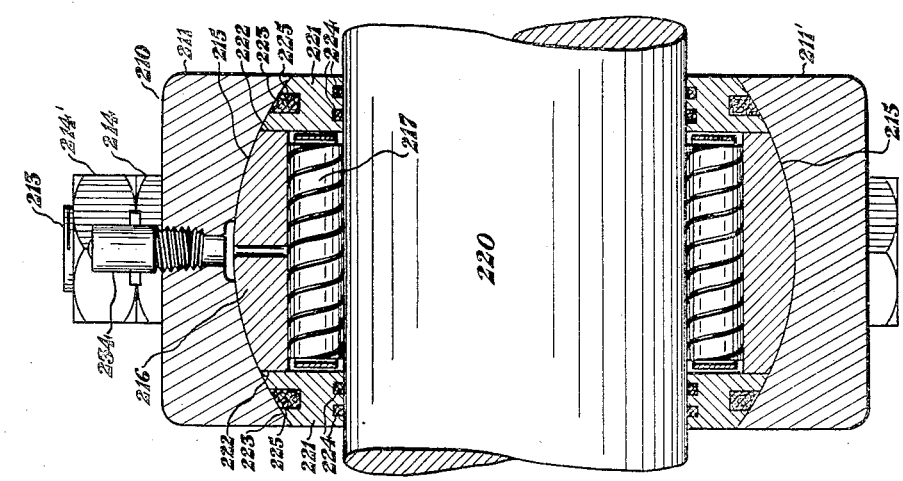
Figure 3:
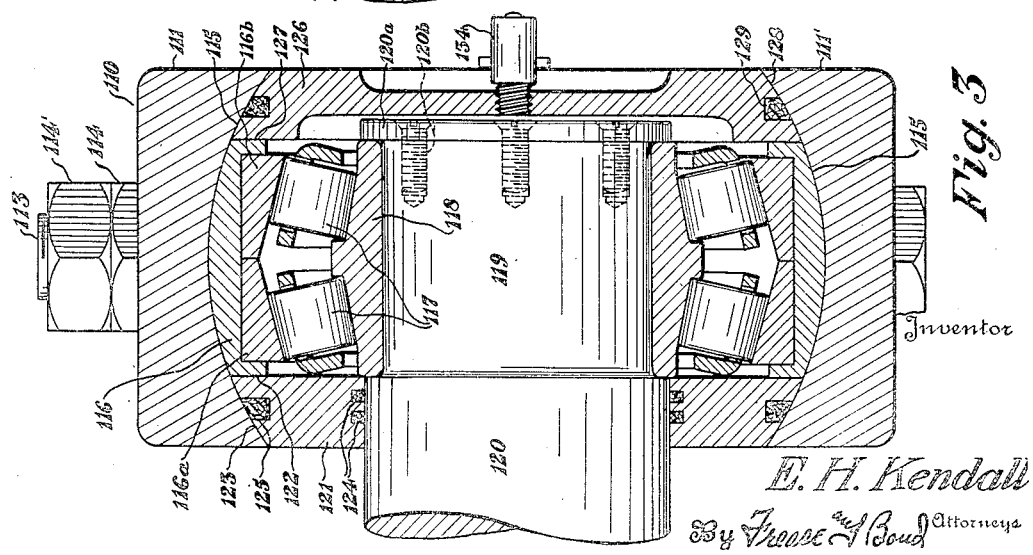

Preferred embodiments of the present improvements are illustrated in the accompanying drawings forming part hereof, in which Figure 1 is a fragmentary end elevation of one embodiment of the improved bearing mounting providing a thrust resisting mounting for a roller bearing of the Hyatt type;

Fig. 2, an axial sectional view thereof as on line 2—2, Fig. 1;

Fig. 3, a view similar to Fig. 2, and illustrating a modified embodiment of the improved bearing mounting for use in connection with a roller bearing of the Timken type and adapted for resisting thrust;

Fig. 4, a view similar to Fig. 2, and illustrating a modified embodiment of the improved bearing mounting for use in connection with a Hyatt type roller bearing in which the rolls contact directly with a through shaft extending through the bearing mounting; and Fig. 5, a view similar to Fig. 2, and illustrating a modified embodiment of the improved bearing mounting for use in connection with a plain sleeve bearing which may be of babbitt, bronze, or the like.

Similar numerals refer to similar parts throughout the several views.

The improved bearing mounting indicated generally at 10 in Figs. 1 and 2, includes caps 11 and 11' whose inner ends may separably abut each other as on a diametral plane 12, and which may be separably secured to each other as by means of bolts 13 passing through suitable registered apertures at the sides of the caps 11 and 11' and provided with suitable lock nuts 14 and 14'.

Inner surfaces of the caps 11 and 11' are spherically complementary with each other as indicated at 15, and are arranged to secure and fit directly about the spherical outer surface of a roller bearing outer raceway ring 16.

The ring 16 is the outer raceway ring of a roller bearing of the Hyatt type including cylindric rolls 17 formed of helically wound rectangular wire, arranged to roll between the outer raceway ring 16 and an inner raceway ring 18 which is fitted upon the bearing seat 19 of reduced diameter on the shaft 20, for which the bearing and mounting are provided.

An oil seal and thrust ring 21 encircles and abuts the shaft 20, and the inner face of the ring 21 abuts as at 22 one end of the outer bearing raceway ring 16.

The outer peripheral face 23 of the ring 21 is spherically continuous with the outer surface of the raceway ring 16 and fits within the spherical internal surfaces of the caps 11 and 11'.

Annular grooves 24 may be provided in the inner cylindrical surface of the ring 21 for receiving suitable packing material for providing an oil seal about the shaft 20, and an annular groove 25 may be provided in the outer spherical surface of the ring 21 for receiving suitable packing material and providing an oil seal between the ring and the caps.

At the other end of the outer raceway ring 16, a thrust plug 26 is provided and includes an inner face abutting as at 27 the other end of the raceway ring 16, and an outer peripheral face 28 spherically continuous with the outer surface of the raceway ring 16.

An annular groove 29 is provided in the outer spherical surface of the plug 26 for receiving suitable packing material for providing an oil seal between the plug and the caps.

A socket 30 is preferably provided in the inner end of the plug 26 for mounting a thrust bearing 31 against which the outer end 32 of the shaft 20 may abut and which thus provides a thrust bearing for any thrust load applied upon the shaft 20.

The inner end of the plug 26 is preferably counterbored to form an annular seat 33 about the bearing 31 for providing a thrust abutment to resist displacement of the inner raceway ring 18.

A suitable fitting 34 may be provided in the cap 11 for connection with a lubrication gun for the purpose of forcing a lubricant through suitable apertures into the oil sealed enclosure for the shaft formed by the caps 11 and 11', and the ring 21 and the plug 26.

The modified embodiment of the improved bearing mounting indicated generally at 110 in Fig. 3, includes caps 111 and 111' whose inner ends may separably abut each other as on a diametral plane, and which may be separably secured to each other as by means of bolts 113 passing through suitable registered apertures at the sides of the caps 111 and 111' and provided with suitable lock nuts 114 and 114'.

Inner surfaces of the caps 111 and 111' are spherically complementary with each other as indicated at 115, and are arranged to secure and fit directly about the spherical outer surface of a roller bearing outer raceway clamp ring 116.

The ring 116 is the outer raceway clamp ring of a thrust roller bearing of the Timken type including tapered rolls 117 arranged to roll between outer raceway rings $116^a$ and $116^b$ clamped by the clamp ring 116 and an inner raceway ring 118 which is secured upon the bearing seat 119 of reduced diameter on the shaft 120, for which the bearing and mounting are provided, as by means of an end plate $120^a$ removably secured to the shaft end as by means of screws $120^b$.

An oil seal and thrust ring 121 encircles and abuts the shaft 120, and the inner face of the ring 121 abuts as at 122 one end of the outer bearing raceway clamp ring 116.

The outer peripheral face 123 of the ring 121 is spherically continuous with the outer surface of the raceway ring 116 and fits within the spherical internal surfaces of the caps 111 and 111'.

Annular grooves 124 may be provided in the inner cylindrical surface of the ring 121 for receiving suitable packing material for providing an oil seal about the shaft 120, and an annular groove 125 may be provided in the outer spherical surface of the ring 121 for receiving suitable packing material and providing an oil seal between the ring and the caps.

At the other end of the outer clamp ring 116, a thrust plug 126 is provided and includes an inner face abutting as at 127 the other end of the raceway clamp ring 116, and an outer peripheral face 128 is spherically continuous with the outer surface of the raceway clamp ring 116.

An annular groove 129 is provided in the outer spherical surface of the plug 126 for receiving a suitable packing material for providing an oil seal between the plug and the caps.

A suitable fitting 134 may be provided in the plug 126 for connection with a lubrication gun for the purpose of forcing a lubricant into the oil sealed enclosure for the shaft formed by the caps 111 and 111', the ring 121 and the plug 126.

The modified embodiment of the improved bearing mounting indicated generally at 210 in Fig. 4, includes caps 211 and 211' whose inner ends may separably abut each other as on a diametral plane and which may be separably secured to each other as by means of bolts 213 passing through suitable registered apertures at the sides of the caps 211 and 211' and provided with suitable lock nuts 214 and 214'.

Inner surfaces of the caps 211 and 211' are spherically complementary with each other as indicated at 215, and are arranged to secure and fit directly about the spherical outer surface of a roller bearing outer raceway ring 216.

The ring 216 is the outer raceway ring of a roller bearing of the Hyatt type including cylindric rolls 217 formed of helically wound rectangular wire arranged to roll between the outer raceway ring 216 and the through shaft 220 for which the bearing and mounting are provided.

Oil seal and thrust rings 221 encircle and abut the shaft 220, and the inner face of each ring 221 abuts as at 222 one end of the outer bearing raceway ring 216.

The outer peripheral face 223 of each ring 221 is spherically continuous with the outer surface of the raceway ring 216 and fits within the spherical internal surfaces of the caps 211 and 211'.

Annular grooves 224 may be provided in the inner cylindrical surface of each ring 221 for receiving suitable packing material for providing an oil seal about the shaft 220, and an annular groove 225 may be provided in the outer spherical surface of each ring 221 for receiving suitable packing material and providing an oil seal between the rings and the caps.

A suitable fitting 234 may be provided in the cap 211 for connection with a lubrication gun for the purpose of forcing a lubricant through suitable apertures into the oil sealed enclosure for the shaft formed by the caps 211 and 211' and the rings 221.

The modified embodiment of the improved bearing mounting indicated generally at 310 in Fig. 5, includes caps 311 and 311' whose inner ends may separably abut each other as on a diametral plane, and which may be separably secured to each other as by means of bolts 313 passing through suitable registered apertures at the sides of the caps 311 and 311' and provided with suitable lock nuts 314 and 314'.

Inner surfaces of the caps 311 and 311' are spherically complementary with each other as indicated at 315, and are arranged to secure and fit directly about the spherical outer surface of a sleeve bearing mounting ring 316.

The sleeve bearing mounting ring 316 carries in a central aperture therein, a sleeve bearing 316$^a$ which may be of bronze, babbit or other desired material and into which extends the shaft 320 for which the bearing and mounting are provided.

An oil seal and thrust ring 321 encircles and abuts the shaft 320 and the inner face of the ring 321 abuts as at 322 one end of the mounting ring 316.

The outer peripheral face 323 of the ring 321 is spherically continuous with the outer surface of the mounting ring 316 and fits within the spherical internal surfaces of the caps 311 and 311'.

Annular grooves 324 may be provided in the inner cylindrical surface of the ring 321 for receiving suitable packing material for providing an oil seal about the shaft 320, and an annular groove 325 may be provided in the outer spherical surface of the ring 321 for receiving suitable packing material and providing an oil seal between the ring and the caps.

At the other end of the mounting ring 316, a thrust plug 326 is provided and includes an inner face abutting as at 327 the other end of the mounting ring 316, and an outer peripheral face 328 spherically continuous with the outer surface mounting ring 316.

An annular groove 329 is provided in the outer spherical surface of the plug 326 for receiving suitable packing material for providing an oil seal between the plug and the caps.

A socket 330 is preferably provided in the inner end of the plug 326 for mounting a thrust bearing 331 against which the outer end 332 of the shaft 320 may abut and which thus provides a thrust bearing for any thrust load applied upon the shaft 320.

A suitable fitting 334 may be provided in the cap 311 for connection with a lubrication gun for the purpose of forcing a lubricant through suitable apertures into the oil sealed enclosure for the shaft formed by the caps 311 and 311', and the ring 321 and the plug 326.

Each embodiment of the improved bearing mounting thus includes separable caps provided with internal spherical surfaces for fitting directly about and securing the outer spherical surface of a bearing ring, a shaft, for which the bearing and mounting is provided, extending and fitting into the ring, and end seals and thrust members having inner faces abutting against the outer end faces of the bearing ring, and having peripheral faces continuing the spherical conformation of the bearing ring and being secured in and by the caps.

The thrust members thus transmit all thrust loads directly from the bearing ring to the caps without the use of any thrust screws or the like, thereby very greatly increasing the maximum thrust resistance possible for the bearing mounting, and simplifying its construction and arrangement.

I claim:

1. A bearing mounting including separable caps provided with complementary internal spherical surfaces, a bearing including an annular member having a spherical outer surface fitting and secured by the spherical inner surfaces of the caps, and a sealing and thrust member having a face for thrust abutment against the end of a shaft fitted in the bearing and an inner face butting against an outer end of the outer annular member and a peripheral face continuing the spherical conformation of the annular member and fitting and secured by the spherical inner surfaces of the caps.

2. A bearing mounting including separable caps provided with complementary internal spherical surfaces, a roller bearing including an outer raceway ring having a spherical outer surface fitting and secured by the spherical inner surfaces of the caps, and a sealing and thrust member having a face for thrust abutment against the end of a shaft fitted in the bearing and an inner face abutting against an outer end of the outer annular member and a peripheral face continuing the spherical conformation of the annular member and fitting and secured by the spherical inner surfaces of the caps.

3. A bearing mounting including separable caps provided with complementary internal spherical surfaces, a bearing including an annular member having a spherical outer surface fitting and secured by the spherical inner surfaces of the caps, and a thrust member having an inner face abutting against an outer end of the outer annular member and a peripheral face continuing the spherical conformation of the annular member and fitting and secured by the spherical inner surfaces of the caps, a shaft extending through the bearing, and the thrust member mounting a thrust bearing adjacent the end of the shaft for abutment therewith to resist thrust loads applied thereon.

4. A bearing mounting including separable caps provided with complementary internal spherical surfaces, a bearing including an annular member having a spherical outer surface fitting and secured by the spherical inner surfaces of the caps, and a sealing and thrust member having a face for thrust abutment against the end of a shaft fitted in the bearing and an inner face abutting against an outer end of the outer annular member and a peripheral face continuing the spherical coformation of the annular member and fitting and secured by the spherical inner surfaces of the caps, and means providing an oil seal between the thrust member and the caps.

5. A bearing mounting including separable caps provided with complementary internal spherical surfaces, a roller bearing including an outer raceway ring having a spherical outer surface fitting and secured by the spherical inner surfaces of the caps, and a sealing and thrust member having a face for thrust abutment against the end of a shaft fitted in the bearing and an inner face abutting against an outer end of the outer annular member and a peripheral face continuing the spherical conformation of the annular member and fitting and secured by the spherical inner surfaces of the caps, and means providing an oil seal between the thrust member and the caps.

6. A bearing mounting including separable caps provided with complementary internal spherical surfaces, a bearing including an annular member having a spherical outer surface fitting and secured by the spherical inner surfaces of the caps, and sealing members each having an inner face abutting against an outer end of the outer annular member and a peripheral face continuing the spherical conformation of the annular member and fitting and secured by the spherical inner surfaces of the caps, a shaft extending through the bearing, and one of the sealing members mounting a thrust bearing adjacent the end of the shaft for abutment therewith to resist thrust loads applied thereon, and means providing an oil seal between each of the sealing members and the caps.

7. A bearing mounting including separable caps provided with complementary internal spherical surfaces, a roller bearing including an outer raceway ring having a spherical outer surface fitting and secured by the spherical inner surfaces of the caps, and sealing members each having an inner face abutting against an outer end of the outer annular member and a peripheral face continuing the spherical conformation of the annular member and fitting and secured by the spherical inner surfaces of the caps, a shaft extending through the bearing, and one of the sealing members mounting a thrust bearing adjacent the end of the shaft for abutment therewith to resist thrust loads applied thereon.

8. A bearing mounting including separable caps provided with complementary internal spherical surfaces, a roller bearing including an outer raceway ring having a spherical outer surface fitting and secured by the spherical inner surfaces of the caps, and sealing members each having an inner face abutting against an outer end of the outer annular member and a peripheral face continuing the spherical conformation of the annular member and fitting and secured by the spherical inner surfaces of the caps, a shaft extending through the bearing, and one of the sealing members mounting a thrust bearing adjacent the end of the shaft for abutment therewith to resist thrust loads applied thereon, and means providing an oil seal between each of the sealing members and the caps.

9. A bearing mounting including separable caps provided with complementary interior spherical surfaces, a bearing including an annular member having a spherical outer surface fitting and secured by the spherical inner surface of the caps, a thrust member having an inner surface abutting against one outer end of the outer annular member and a peripheral surface continuing the spherical conformation of the annular member and fitting and secured by the spherical inner surface of the caps, a shaft extending through the bearing, the thrust member mounting a thrust bearing adjacent the end of the shaft for abutment therewith to resist thrust loads applied thereon, and a sealing member having a face abutting the shaft fitted in the bearing and an inner face abutting against the other outer end of the annular outer member and a peripheral face continuing the spherical conformation of the annular member and fitting and secured by the spherical inner surface of the caps.

10. A bearing mounting including separable caps provided with complementary internal spherical surfaces, a bearing including an annular member having a spherical outer surface fitting and secured by the spherical inner surfaces of the caps, and a sealing member having a face abutting against a shaft fitted in the bearing and an inner face abutting against an outer end of the outer annular member and a peripheral face continuing the spherical conformation of the annular member and fitting and secured by the spherical inner surfaces of the caps.

11. A bearing mounting including separable caps provided with complementary internal spherical surfaces, a roller bearing including an outer raceway ring having a spherical outer surface fitting and secured by the spherical inner surfaces of the caps, and a sealing member having a face abutting against a shaft fitted in the bearing and an inner face abutting against an outer end of the outer annular member and a peripheral face continuing the spherical conformation of the annular member and fitting and secured by the spherical inner surfaces of the caps.

12. A bearing mounting including separable caps provided with complementary internal spherical surfaces, a bearing including an annular member having a spherical outer surface fitting and secured by the spherical inner surfaces of the caps, and a sealing member having a face abutting against a shaft fitted in the bearing and an inner face abutting against an outer end of the outer annular member and a peripheral face continuing the spherical conformation of the annular member and fitting and secured by the spherical inner surfaces of the caps, and means providing an oil seal between the member and the caps.

13. A bearing mounting including separable caps provided with complementary internal spherical surfaces, a roller bearing including an outer raceway ring having a spherical outer surface fitting and secured by the spherical inner surfaces of the caps, and a sealing member having a face abutting against a shaft fitted in the bearing and an inner face abutting against an outer end of the outer annular member and a peripheral face continuing the spherical conformation of the annular member and fitting and secured by the spherical inner surfaces of the caps, and means providing an oil seal between the member and the caps.

In testimony that I claim the above, I have hereunto subscribed my name.

EDGAR HOMER KENDALL.